US010047251B2

(12) United States Patent
Miyamoto

(10) Patent No.: US 10,047,251 B2
(45) Date of Patent: Aug. 14, 2018

(54) RUBBER COMPOSITION ADHESIVE TO METAL SURFACE, LAMINATED BODY OF RUBBER COMPOSITION AND METAL, VULCANIZED RUBBER PRODUCT, AND METHOD OF PRODUCING VULCANIZED RUBBER PRODUCT

(71) Applicant: The Yokohama Rubber Co., LTD., Minato-ku, Tokyo (JP)

(72) Inventor: Tomoaki Miyamoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 371 days.

(21) Appl. No.: 14/786,528

(22) PCT Filed: Apr. 18, 2014

(86) PCT No.: PCT/JP2014/061067
§ 371 (c)(1),
(2) Date: Oct. 22, 2015

(87) PCT Pub. No.: WO2014/175186
PCT Pub. Date: Oct. 30, 2014

(65) Prior Publication Data
US 2016/0096981 A1    Apr. 7, 2016

(30) Foreign Application Priority Data

Apr. 23, 2013  (JP) ................ 2013-090757
Apr. 23, 2013  (JP) ................ 2013-090758

(51) Int. Cl.
*C09J 109/00* (2006.01)
*C08K 3/22* (2006.01)
*C08K 3/26* (2006.01)
*B32B 37/14* (2006.01)
*C09J 171/08* (2006.01)
*B32B 15/06* (2006.01)
*B32B 1/08* (2006.01)
*B32B 15/02* (2006.01)
*B32B 25/16* (2006.01)
*C08K 3/34* (2006.01)
*C09J 133/02* (2006.01)
*C08K 3/00* (2018.01)
*C09J 201/00* (2006.01)
*C08L 9/00* (2006.01)
*C08L 101/12* (2006.01)
*C08K 3/36* (2006.01)
*C08K 3/013* (2018.01)
*B32B 38/00* (2006.01)

(52) U.S. Cl.
CPC .............. *C09J 109/00* (2013.01); *B32B 1/08* (2013.01); *B32B 15/02* (2013.01); *B32B 15/06* (2013.01); *B32B 25/16* (2013.01); *B32B 37/14* (2013.01); *C08K 3/00* (2013.01); *C08K 3/013* (2018.01); *C08K 3/22* (2013.01); *C08K 3/26* (2013.01); *C08K 3/34* (2013.01); *C08K 3/346*

(2013.01); *C08K 3/36* (2013.01); *C08L 9/00* (2013.01); *C08L 101/12* (2013.01); *C09J 133/02* (2013.01); *C09J 171/08* (2013.01); *C09J 201/00* (2013.01); *B32B 2038/0076* (2013.01); *B32B 2307/726* (2013.01); *B32B 2597/00* (2013.01); *C08K 2003/2227* (2013.01); *C08K 2003/265* (2013.01); *C08K 2003/267* (2013.01)

(58) Field of Classification Search
CPC .. F16L 11/00; F16L 11/04; F16L 11/08; F16L 11/082; F16L 11/083; F16L 11/085; F16L 11/081; F16L 11/086; F16L 11/087; F16L 11/088; B32B 1/02; B32B 1/08; B32B 15/00; B32B 15/02; B32B 15/04; B32B 15/06; B32B 15/085; B32B 15/18; B32B 15/20; C09J 11/08; C09J 109/00; C09J 109/02; C09J 109/04; C09J 109/06; C09J 109/08; C09J 109/10; C08L 9/00; C08L 9/02; C08L 9/04; C08L 9/06; C08L 9/08; C08L 9/10; C08L 21/00; C08L 21/02
See application file for complete search history.

(56) References Cited

U.S. PATENT DOCUMENTS

| 5,085,905 A * | 2/1992 | Beck ........................ C08J 5/10 |
| | | 156/307.3 |
| 5,115,035 A | 5/1992 | Shiraki et al. |
| 5,332,784 A | 7/1994 | Shiraki et al. |
| 2006/0127620 A1 * | 6/2006 | Fisher ................... F16L 11/127 |
| | | 428/36.91 |
| 2010/0104787 A1 | 4/2010 | Gong et al. |

FOREIGN PATENT DOCUMENTS

| CN | 101627083 | 1/2010 |
| JP | S51-013848 | 2/1976 |

(Continued)

OTHER PUBLICATIONS

JPS63-288742 English Machine Translation prepared Dec. 23, 2017 (Year: 2017).*

(Continued)

*Primary Examiner* — Christopher M Rodd
(74) *Attorney, Agent, or Firm* — Thorpe North & Western

(57) ABSTRACT

The present technology provides a rubber composition comprising: from 1.0 part by mass to 15 parts by mass of water, and from 0.5 parts by mass to 10 parts by mass of water absorbing resin as a water retaining agent, or from 0.5 parts by mass to 20 parts by mass of inorganic water retaining agent as a water retaining agent, per 100 parts by mass of diene polymer that can be sulfur-vulcanized.

10 Claims, 4 Drawing Sheets

(56) References Cited

FOREIGN PATENT DOCUMENTS

| | | |
|---|---|---|
| JP | S61-0136524 | 6/1986 |
| JP | S62-048742 | 3/1987 |
| JP | S62-0197433 | 9/1987 |
| JP | S63-0288742 | 11/1988 |
| JP | H06-0306208 | 11/1994 |
| JP | 2000-007838 | 1/2000 |
| JP | 2000-017108 | 1/2000 |
| JP | 2000-256506 | 9/2000 |
| JP | 2000-344956 | 12/2000 |
| JP | 2002-013083 | 1/2002 |
| JP | 2007-160789 | 6/2007 |
| JP | 2008-074926 | 4/2008 |
| WO | WO 87/02369 | 4/1987 |
| WO | WO 2008/108198 | 9/2008 |

OTHER PUBLICATIONS

JPS62-197433 English Machine Translation prepared Dec. 23, 2017 (Year: 2017).*
Occupational Toxicants, vol. 15, Jan. 31, 2012 (Year: 2012).*
International Search Report for International Application No. PCT/JP2014/061067 dated Jul. 22, 2014, 4 pages, Japan.

* cited by examiner

RUBBER COMPOSITION ADHESIVE TO METAL SURFACE, LAMINATED BODY OF RUBBER COMPOSITION AND METAL, VULCANIZED RUBBER PRODUCT, AND METHOD OF PRODUCING VULCANIZED RUBBER PRODUCT

TECHNICAL FIELD

The present technology relates to a rubber composition adhesive to a metal surface, a laminated body of the rubber composition and a metal, a vulcanized rubber product, and a method of producing the vulcanized rubber product.

BACKGROUND

As hydraulic hoses and high pressure hoses (hereinafter, collectively referred to as "hydraulic hoses" or the like) that are used in various industrial purposes, hoses having a configuration, in which a reinforcing layer formed by braiding reinforcing yarn and steel wire is provided in between a rubber layer and another rubber layer so that functions as a hose can be maintained without causing liquid leakage or the like even in a severe environment involving great fluctuations in temperature and/or pressure, have been known. To enhance the adhesion to a rubber layer, such a reinforcing layer is used after, for example, its surface is plated with a metal such as brass.

Japanese Unexamined Patent Application Publication No. 2002-13083A describes a rubber composition that contains a rubber component and a porous inorganic filler and that enhances the adhesion of a brass-plated reinforcing layer and a rubber layer by releasing moisture during vulcanization.

However, the rubber composition described in Japanese Unexamined Patent Application Publication No. 2002-13083A cannot maintain water content that is necessary during vulcanization because of vaporization of moisture during storage for a long period of time, and as a result, the adhesion between the rubber layer and the reinforcing layer may decrease. In particular, when vulcanization is performed by an oven vulcanization method, which is a continuous vulcanization method, to enhance productivity, vaporization of moisture during vulcanization is remarkable and it may not be possible to achieve sufficient adhesion between the rubber layer and the reinforcing layer. Therefore, a rubber composition having good adhesion to a metal-plated reinforcing layer has been desired.

SUMMARY

The present technology provides a rubber composition having good adhesion to a metal-plated reinforcing layer, a laminated body of the rubber composition and a metal of such a rubber composition and a reinforcing layer, a vulcanized product obtained by vulcanizing such a laminated body of the rubber composition and a metal, and a method of producing the vulcanized product.

The rubber composition adhesive to a metal surface of the present technology is a rubber composition adhesive to a metal surface, the rubber composition being capable of adhering to a metal surface, and the rubber composition comprises: from 1.0 part by mass to 15 parts by mass of water, and from 0.5 parts by mass to 10 parts by mass of water absorbing resin as a water retaining agent, per 100 parts by mass of diene polymer that can be sulfur-vulcanized.

In the rubber composition adhesive to a metal surface of the present technology, the water absorbing resin is preferably at least one type selected from the group consisting of a poly(acrylic acid) partial sodium salt crosslinked product, a modified acrylic crosslinked polymer, and a polyether compound.

In the rubber composition adhesive to a metal surface of the present technology, the polyether compound is preferably polyethylene oxide or polyethylene glycol.

The rubber composition adhesive to a metal surface of the present technology is a rubber composition adhesive to a metal surface, the rubber composition being capable of adhering to a metal surface, and the rubber composition comprises: from 1.0 part by mass to 15 parts by mass of water, and from 0.5 parts by mass to 20 parts by mass of inorganic water retaining agent as a water retaining agent, per 100 parts by mass of diene polymer that can be sulfur-vulcanized.

In the rubber composition adhesive to a metal surface of the present technology, the inorganic water retaining agent is preferably at least one type selected from the group consisting of water-swellable clay, silica, aluminum hydroxide, aluminum oxide, calcium carbonate, magnesium carbonate, and zeolite.

In the rubber composition adhesive to a metal surface of the present technology, the metal surface is preferably a brass-plated metal surface.

In the rubber composition adhesive to a metal surface of the present technology, the diene polymer preferably contains at least one type selected from the group consisting of natural rubber (NR), isoprene rubber (IR), styrene-butadiene rubber (SBR), nitrile-butadiene rubber (NBR), ethylene-propylene-diene rubber (EPDM), and chloroprene rubber (CR).

In the rubber composition adhesive to a metal surface of the present technology, the rubber composition preferably further comprises a vulcanizing agent.

The laminated body of the rubber composition and a metal of the present technology is a laminated body in which a rubber layer containing the rubber composition adhesive to a metal surface described above and a reinforcing layer having a metal surface are laminated.

In the laminated body of the rubber composition and a metal of the present technology, the metal surface is preferably a brass-plated metal surface.

In the laminated body of the rubber composition and a metal of the present technology, the reinforcing layer preferably has a braided structure in which wires have been braided, or a spiral structure.

In a vulcanized rubber product of the present technology, the rubber layer of the laminated body of the rubber composition and a metal described above is vulcanized in the presence of a sulfur-containing vulcanizing agent and adhered to the reinforcing layer.

In the vulcanized rubber product of the present technology, the vulcanized rubber product is preferably a hydraulic hose or a high pressure hose.

In the vulcanized rubber product of the present technology, the hydraulic hose or the high pressure hose is preferably vulcanized by passing through an oven vulcanization device.

The method of producing a vulcanized rubber product of the present technology is a method comprises: a laminating step for producing a laminated body by laminating a reinforcing layer in which a surface is plated with brass and at least one rubber layer; and a vulcanization adhering step of vulcanizing the rubber layer by passing the laminated body through an oven vulcanization device and adhering the brass-plated reinforcing layer; the rubber layer is a rubber composition containing: from 1.0 part by mass to 15 parts by mass of water, and from 0.5 parts by mass to 10 parts by mass of water absorbing resin as a water retaining agent, per 100 parts by mass of diene polymer that can be sulfur-vulcanized; and the vulcanized rubber product further comprises a sulfur-containing vulcanizing agent.

The method of producing a vulcanized rubber product of the present technology is a method comprises: a laminating step for producing a laminated body by laminating a reinforcing layer in which a surface is plated with brass and at least one rubber layer; and a vulcanization adhering step of vulcanizing the rubber layer by passing the laminated body through an oven vulcanization device and adhering the brass-plated reinforcing layer; the rubber layer is a rubber composition containing: from 1.0 part by mass to 15 parts by mass of water, and from 0.5 parts by mass to 20 parts by mass of inorganic water retaining agent as a water retaining agent, per 100 parts by mass of diene polymer that can be sulfur-vulcanized; and the vulcanized rubber product further comprises a sulfur-containing vulcanizing agent.

According to the present technology, a rubber composition having good adhesion to a metal-plated, particularly brass-plated, reinforcing layer, a laminated body of the rubber composition and a metal of such a rubber composition and a reinforcing layer, a vulcanized product obtained by vulcanizing such a laminated body of the rubber composition and a metal, and a method of producing the vulcanized product can be provided. The present technology can be suitably used in a hose that is continuously produced by an oven vulcanization method.

BRIEF DESCRIPTION OF THE DRAWING(S)

DETAILED DESCRIPTION

Figure 1:
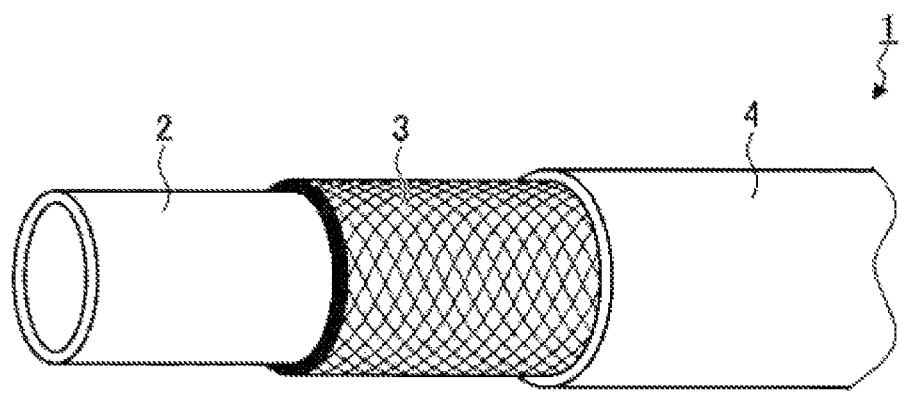
FIG. 1 is a partial cutaway perspective view of an example of a hydraulic hose according to the present embodiment.

The present technology is explained in detail below. However, the present technology is not limited to that described in the following embodiments and working examples. Furthermore, the constituents described below in the embodiments and working examples include constituents that could be easily conceived by a person skilled in the art and constituents that are substantially identical, or, in other words, the constituents that are equivalent in scope. Furthermore, the constituents disclosed in the embodiments and working examples described below can be suitably combined or can be suitably selected for use.

[Rubber Composition]

A rubber composition according to the present embodiment will be described below. The rubber composition according to the present embodiment is a rubber composition being capable of adhering to a brass-plated wire reinforcing layer, and the rubber composition comprises: from 1.0 part by mass to 15 parts by mass of water, and from 0.5 parts by mass to 10 parts by mass of water absorbing resin as a water retaining agent, or from 0.5 parts by mass to 20 parts by mass of inorganic water retaining agent as a water retaining agent, per 100 parts by mass of diene polymer that can be sulfur-vulcanized. Each component constituting the rubber composition will be described below.

<Diene Polymer>

Examples of the diene polymer that can be sulfur-vulcanized include natural rubber (NR), isoprene rubber (IR), styrene-butadiene rubber (SBR), nitrile-butadiene rubber (NBR), ethylene-propylene-diene rubber (EPDM), and chloroprene rubber (CR). One type of these sulfur vulcanizable diene polymers may be used alone, or two or more types of sulfur vulcanizable diene polymers may be used in combination.

In the present embodiment, "sulfur vulcanizable" refers to properties that can form a crosslinking structure using sulfur as a medium. Sulfur is provided by a vulcanizing agent described below.

The compounded amount of the sulfur vulcanizable diene polymer is preferably from 20% by mass to 70% by mass relative to the total amount of the rubber composition from the perspectives of achieving good mixing processability and good appearance to the rubber.

<Water>

The water may be tap water or purified water such as distilled water, ion-exchanged water, and filtered water. Also, the water may be moisture that is absorbed in a filler (e.g. carbon black). The compounded amount of the water is preferably 1.0 part by mass or greater, and more preferably 3.0 parts by mass or greater, but preferably 15 parts by mass or less, and more preferably 11 parts by mass or less, per 100 parts by mass of the diene polymer. When the compounded amount of the water is within the range described above, the suitable water content can be stably maintained in the composition until the time of vulcanization even when the composition is stored for a long period of time since the water is compounded together with a water retaining agent described below in the composition, and thus good adhesion between a rubber layer and a reinforcing layer can be maintained even for production of hoses via continuous production using an oven vulcanization method which involves large amount of water vaporization. Taking these into consideration, the compounded amount of water is preferably from 1.0 part by mass to 15 parts by mass, and more preferably from 3.0 parts by mass to 11 parts by mass, per 100 parts by mass of the diene polymer.

<Water Retaining Agent>

The water retaining agent has a function of stably maintaining water in a rubber composition (compound). In the present embodiment, a water absorbing resin and an inorganic water retaining agent can be used as a water retaining agent. These may be used alone, or two or more types may be used in combination.

<Water Absorbing Resin>

Typically, "water absorbing resin" refers to a resin achieving the amount of water absorption of 10 g or greater per 1 g of the resin. As the water absorbing resin, a porous material having a three-dimensional network structure that is highly hydrophilic and that can absorb water in its pores (holes) is preferable. As the water absorbing resin, for example, at least one type selected from the group consisting of poly(acrylic acid) partial sodium salt crosslinked products, modified acrylic crosslinked polymers, and polyether compounds is preferable.

Examples of the poly(acrylic acid) partial sodium salt crosslinked product include a product having the trade name "AQUALIC (registered trademark) CA" (manufactured by Nippon Shokubai Co., Ltd.) and the like.

Examples of the modified acrylic crosslinked polymer include a product having the trade name "AQUALIC (registered trademark) CS" (manufactured by Nippon Shokubai Co., Ltd.) and the like.

Examples of the polyether compound include polyethylene oxide, polyethylene glycol, and the like.

The compounded amount of the water absorbing resin is preferably 0.5 parts by mass or greater, and more preferably 3.0 parts by mass or greater, but preferably 10 parts by mass or less, and more preferably 6 parts by mass or less, per 100 parts by mass of the diene polymer. When the compounded amount of the water absorbing resin is within the range described above, the suitable water content can be stably maintained in the composition until the time of vulcanization even when the composition is stored for a long period of time since the water absorbing resin is compounded together with water described above in the composition, and thus good adhesion between a rubber layer and a reinforcing layer can be maintained even for production of hoses via continuous production using an oven vulcanization method which involves large amount of water vaporization. Note that, when the compounded amount of the water absorbing resin is too large, the appearance of the rubber will be deteriorated due to its high water absorbency. Therefore, the water absorbing resin is preferably used within the range described above. Taking these into consideration, the compounded amount of the water absorbing resin is preferably from 0.5 parts by mass to 10 parts by mass, and more preferably 3.0 parts by mass to 6 parts by mass, per 100 parts by mass of the diene polymer.

<Inorganic Water Retaining Agent>

As the inorganic water retaining agent, for example, a porous material that can absorb water in its pores (holes) is preferable. Examples of the inorganic water retaining agent include water-swellable clay, silica (white carbon black), aluminum hydroxide, aluminum oxide, calcium carbonate, magnesium carbonate, zeolite, and the like. Examples of the silica include crystallized silica, precipitated silica, amorphous silica (e.g. high temperature treated silica), fumed silica, calcined silica, precipitated silica, pulverized silica, molten silica, and the like. Among these, water-swellable clay and silica are preferable, and water-swellable clay is more preferable. One type of these inorganic water retaining agents may be used alone, or two or more types of these inorganic water retaining agents may be used in combination.

"Water-swellable clay" refers to clay that can absorb water to increase its own volume. Examples of the water-swellable clay include smectite-based clay minerals, such as montmorillonite, beidellite, hectorite, saponite, and stevensite, as well as vermiculite and the like. Among these, bentonite having montmorillonite as a main component is preferable.

The compounded amount of the inorganic water retaining agent is preferably 0.5 parts by mass or greater, and more preferably 3.0 parts by mass or greater, but preferably 20 parts by mass or less, and more preferably 12 parts by mass or less, per 100 parts by mass of the diene polymer. When the compounded amount of the inorganic water retaining agent is within the range described above, the suitable water content can be stably maintained in the composition until the time of vulcanization even when the composition is stored for a long period of time since the inorganic water retaining agent is compounded together with water described above in the composition, and thus good adhesion between a rubber layer and a reinforcing layer can be maintained even for production of hoses via continuous production using an oven vulcanization method which involves large amount of water vaporization. Taking these into consideration, the compounded amount of the inorganic water retaining agent is preferably from 0.5 parts by mass to 20 parts by mass, and more preferably 3.0 parts by mass to 12 parts by mass, per 100 parts by mass of the diene polymer.

<Vulcanizing Agent>

The rubber composition is preferably vulcanized in the presence of sulfur, and the rubber composition preferably further contains a sulfur-containing vulcanizing agent. Examples of the sulfur-containing vulcanizing agent include sulfur, tetramethylthiuram disulfide (TMTD), tetraethylthiuram disulfide (TETD), tetrabutylthiuram disulfide (TBTD), dip entamethylenethiuram tetrasulfide (DPTT), tetrabenzylthiuram disulfide, dimorpholine disulfide, and sulfur-containing organic compounds, such as alkylphenol disulfide. Examples of the sulfur include powdered sulfur, precipitated sulfur, highly dispersible sulfur, surface-treated sulfur, insoluble sulfur, and the like.

As the vulcanizing agent, the rubber composition may further contain a non-sulfur-based vulcanizing agent described below. Examples of the non-sulfur-based vulcanizing agent include organic peroxide-based vulcanizing agents, metal oxide-based vulcanizing agents, phenolic resins, quinone dioxime, and the like.

Examples of the organic peroxide-based vulcanizing agent include dicumyl peroxide, benzoyl peroxide, t-butyl hydroperoxide, 2,4-dichlorobenzoyl peroxide, 2,5-dimethyl-2,5-di(t-butylperoxy)hexane, 2,5-dimethylhexane-2,5-di (peroxyl benzoate), and the like.

Examples of the other vulcanizing agent include zinc oxide, magnesium oxide, resins such as phenol resin, p-quinone dioxime, p-dibenzoylquinone dioxime, poly-p-dinitrosobenzene, methylenedianiline, and the like.

The rubber composition according to the present embodiment preferably further contains a vulcanization accelerator. Examples of the vulcanization accelerator include aldehyde-ammonia-based vulcanization accelerators, aldehyde-amine-based vulcanization accelerators, thiourea-based vulcanization accelerators, guanidine-based vulcanization accelerators, thiazole-based vulcanization accelerators, sulfenamide-based vulcanization accelerators, thiuram-based vulcanization accelerators, dithiocarbamate-based vulcanization accelerators, and xanthogenate-based vulcanization accelerators. One of these may be used alone, or two or more may be used in combination.

[Other Additives]

The rubber composition may contain other additives, if necessary, in a range that the effect of the present technology can be exhibited. Examples of the other additive include fillers, plasticizers, softeners, antiaging agents, organic activators, antioxidants, antistatic agents, flame retardants, crosslinking-accelerating auxiliaries, vulcanization retarders, adhesive auxiliaries, and the like.

Examples of the fillers include carbon black, clay, talc, iron oxide, zinc oxide (ZnO), titanium oxide, barium oxide, magnesium oxide, zinc carbonate, barium sulfate, mica, diatomaceous earth, and the like. One type of these may be used alone, or two or more types of these may be used in combination. As the carbon black, any carbon black can be suitably selected and used depending on the purpose. ISAF and FEF carbon blacks are preferable as the carbon black. In particular, carbon black is known to generate a carbon gel (bound rubber) and can be suitably used if necessary. Examples of the clay include pyrophyllite clay, kaolin clay, calcined clay, and the like.

Examples of the plasticizer include dioctyl phthalate (DOP), dibutyl phthalate (DBP), dioctyl adipate (DOA), isodecyl succinate, di(ethylene glycol) dibenzoate, pentaerythritol ester, butyl oleate, methyl acetyl ricinoleate, tricresyl phosphate, trioctyl phosphate, trimellitic acid ester, propylene glycol adipate polyester, butylene glycol adipate polyester, naphthenic oil, and the like. One type of these may be used alone, or two or more types of these may be used in combination.

Specific examples of the softener include aromatic oil, naphthenic oil, paraffinic oil, petroleum resin, vegetable oil, liquid rubber, and the like. One type of these may be used alone, or two or more types of these may be used in combination.

Examples of the antiaging agent include N-(1,3-dimethylbutyl)-N'-phenyl-p-phenylenediamine (6PPD), N,N'-dinaphthyl-p-phenylenediamine (DNPD), N-isopropyl-N'-phenyl-p-phenylenediamine (IPPD), styrenated phenol (SP), 2,2,4-trimethyl-1,2-dihydroquinoline polymer (RD), and the like. One type of these may be used alone, or two or more types of these may be used in combination.

Examples of the organic activator include stearic acid, oleic acid, lauric acid, zinc stearate, and the like. One type of these may be used alone, or two or more types of these may be used in combination.

Examples of the antioxidants include butylhydroxytoluene (BHT), and butylhydroxyanisole (BHA).

Examples of the antistatic agent include quaternary ammonium salts; and hydrophilic compounds such as polyglycols and ethylene oxide derivatives.

Examples of the flame retardant include chloroalkyl phosphates, dimethyl-methyl phosphonates, bromine-phosphorus compounds, ammonium polyphosphates, neopentyl bromide polyethers, brominated polyethers, and the like. Examples of non-halogen-based flame retardant include aluminum hydroxide, magnesium hydroxide, tricresyl phosphate, and diphenyl cresol phosphate.

A conventional auxiliary for rubber can be used in conjunction as a cross-linking promoter. As the auxiliary for rubber, zinc oxide; stearic acid, oleic acid, and Zn salts thereof can be used.

Examples of the vulcanization retarder include organic acids such as phthalic anhydride, benzoic acid, salicylic acid, and acetylsalicylic acid; nitroso compounds such as polymers of N-nitroso-diphenylamine, N-nitroso-phenyl-β-naphthylamine, and N-nitroso-trimethyl-dihydroquinoline; halides such as trichloromelanine; 2-mercaptobenzimidazole, N-(cyclohexylthio)phthalimide (PVI), and the like. One type of these may be used alone, or two or more types of these may be used in combination.

Examples of the adhesive auxiliary include triazine thiol compounds (e.g. 2,4,6-trimercapto-1,3,5-triazine and 6-butylamino-2,4-dimercapto-1,3,5-triazine), resorcin, cresol, resorcin-formalin latex, monomethylol melamine, monomethylol urea, ethylene maleimide, cobalt naphthenate, cobalt stearate, cobalt versatate, cobalt dodecanoate, and the like. One type of these adhesives may be used alone, or two or more types of these may be used in combination.

The additives described above may be used alone or may be used in any combination of two or more types.

<Method of Producing Rubber Composition>

The method of producing the rubber composition according to the present embodiment is not particularly limited, and a conventionally known method can be used. The rubber composition can be produced by blending a diene polymer, water, a water retaining agent, and as necessary a vulcanizing agent and other additives. For example, the rubber composition can be produced by kneading the diene polymer, water, the water retaining agent, and as necessary a vulcanizing agent and other additives using a Banbury mixer, kneader, or the like.

[Laminated Body of the Rubber Composition and a Metal]

The laminated body of the rubber composition and a metal according to the present embodiment is a laminated body of the rubber composition described above and a reinforcing layer of a wire having a metal plated surface. FIG. 1 illustrates the basic structure for the case where the laminated body of the rubber composition and a metal is formed into a hose. FIG. 1 is a partial cutaway perspective view of an example of a hydraulic hose according to the present embodiment. As illustrated in FIG. 1, the hose 1 comprises an inner rubber layer 2 for passing fluid therein, a reinforcing layer 3 provided on the outer side of the inner rubber layer 2, and an outer rubber layer 4 provided on the outer side of the reinforcing layer 3. The inner side rubber layer 2 and/or the outer side rubber layer 4 are rubber layers composed of the rubber composition according to the embodiment described above. The reinforcing layer 3 is a wire braid in which steel wires having a surface plated with brass are braided. The reinforcing layer 3 is arranged in a manner that the inner side rubber layer 2 and the outer side rubber layer 4 sandwich the reinforcing layer 3. The inner side rubber layer 2, the reinforcing layer 3, and the outer side rubber layer 4 are adhered and fixed by the vulcanization of the inner side rubber layer 2 and the outer side rubber layer 4.

<Rubber Layer>

As described above, at least one of the inner side rubber layer 2 and the outer side rubber layer 4 is composed of the rubber composition according to the embodiment described above. From the perspective of weatherability of the hose, it is preferable to form at least the outer side rubber layer 4 using the rubber composition according to the embodiment described above.

The thickness of the inner side rubber layer 2 is, for example, preferably from 0.2 mm to 4.0 mm, and more preferably from 0.5 mm to 2.0 mm. Similarly, the thickness of the outer side rubber layer 4 is, for example, preferably from 0.2 mm to 4.0 mm, and more preferably from 0.5 mm to 2.0 mm.

<Reinforcing Layer>

The reinforcing layer 3 is a layer provided in between the inner side rubber layer 2 and the outer side rubber layer 4 from the perspective of maintaining strength. The reinforcing layer 3 is formed by a wire braid in which steel wires are braided.

The reinforcing layer 3 may be, other than a wire braid, spiral wires formed by winding steel wires spirally around the inner side rubber layer 2. Materials, and a braiding method, weaving method, or winding method that forms the reinforcing layer can be suitably selected depending on the application, for example depending on pressure resistance. In the hydraulic hose and the like, the reinforcing layer is preferably formed by a wire braid.

Examples of the wire materials include piano wires (carbon steel), hard steel wires, and stainless steel wires. From the perspectives of processability and strength, piano wires (carbon steel) and hard steel wires are particularly preferable as the wire materials.

In order to enhance the adhesion toward the rubber layer, the surface of the reinforcing layer 3 is plated with a metal.

This metal plating is a brass coating applied on piano wires and hard steel wires. The brass coating is formed by plating a steel wire with copper, plating with zinc over the copper, and then subjecting the wire to thermal diffusion processing.

[Vulcanized Rubber Product]

In the laminated body of the rubber composition and a metal of the rubber composition and the reinforcing layer 3 described above, molecules in the rubber forming the inner side rubber layer 2 and the outer side rubber layer 4 are crosslinked each other by sulfur when crosslinked, i.e. vulcanized, in the presence of a sulfur-containing vulcanizing agent. This crosslinking imparts elasticity and tensile strength to the inner side rubber layer 2 and the outer side rubber layer 4, and adheres the inner side rubber layer 2 and the outer side rubber layer 4 to the reinforcing layer 3 due to the bond formed between the sulfur and the metal (copper, zinc) constituting the brass coating, at the interface between the rubber layers and the reinforcing layer 3.

The sulfur-containing vulcanizing agent is preferably blended together with other materials when a compound of the rubber composition is formed. Note that the time at which sulfur-containing vulcanizing agent is blended is not limited to the time when the compound is prepared as long as molecules forming the diene polymer are crosslinked each other by the sulfur, and as long as the inner side rubber layer 2 and the outer side rubber layer 4 are adhered to the reinforcing layer 3 due to the bond formed between the sulfur and the metal (copper, zinc) at the interface between the inner side rubber layer 2 and the outer side rubber layer 4 and the reinforcing layer 3, and the like.

An example of the method of vulcanization is a method in which the rubber composition is heat-treated at a predetermined temperature for predetermined time period in the presence of the sulfur-containing vulcanizing agent. The vulcanization temperature is preferably from 130° C. to 180° C. The vulcanization time is preferably from 30 minutes to 240 minutes. By a combination of the temperature and the time in these ranges, desired physical properties as a vulcanized rubber product such as elasticity, tensile strength, appearance, adhesion at the interface between the rubber and the metal, and rubber adhesion at the interface between the rubber and the metal can be imparted.

The vulcanized rubber product in the present embodiment can be suitably used as a hydraulic hose and the like. Examples of the method of producing a hydraulic hose and the like include a steam vulcanization method in which the laminated body of the rubber composition and a metal is placed and sealed in a pressure vessel and crosslinked in a steam boiler, and an oven vulcanization method in which the laminated body of the rubber composition and a metal is covered with a nylon cloth or the like and vulcanized in a hot-air drying oven. In general, the steam vulcanization method is a batch type treatment, and the oven vulcanization method is a continuous type treatment. The method of producing a hydraulic hose is preferably an oven vulcanization method which is a continuous type treatment.

[Production Method of Vulcanized Rubber Product]

A method of producing a vulcanized rubber product according to the present embodiment will be described below. Here, an example of the case where a hydraulic hose is produced as the vulcanized rubber product will be described.

<Production of Hydraulic Hose>

As illustrated in FIG. 1, the hydraulic hose 1 has a structure in which, on the peripheral surface of the inner side rubber layer 2, the reinforcing layer 3 and the outer side rubber layer 4 are sequentially laminated. Note that, in the example illustrated in FIG. 1, the reinforcing layer 3 is one layer; however, a plurality of the reinforcing layers 3 between which a middle rubber layer is provided may be provided. Note that, as described above, the outer side rubber layer 4 is preferably formed from the rubber composition according to the embodiment described above, and the inner side rubber layer 2 is preferably formed using a rubber composition having an acrylonitrile butadiene rubber (NBR), which exhibits excellent oil resistance, as a main component.

Figure 2:
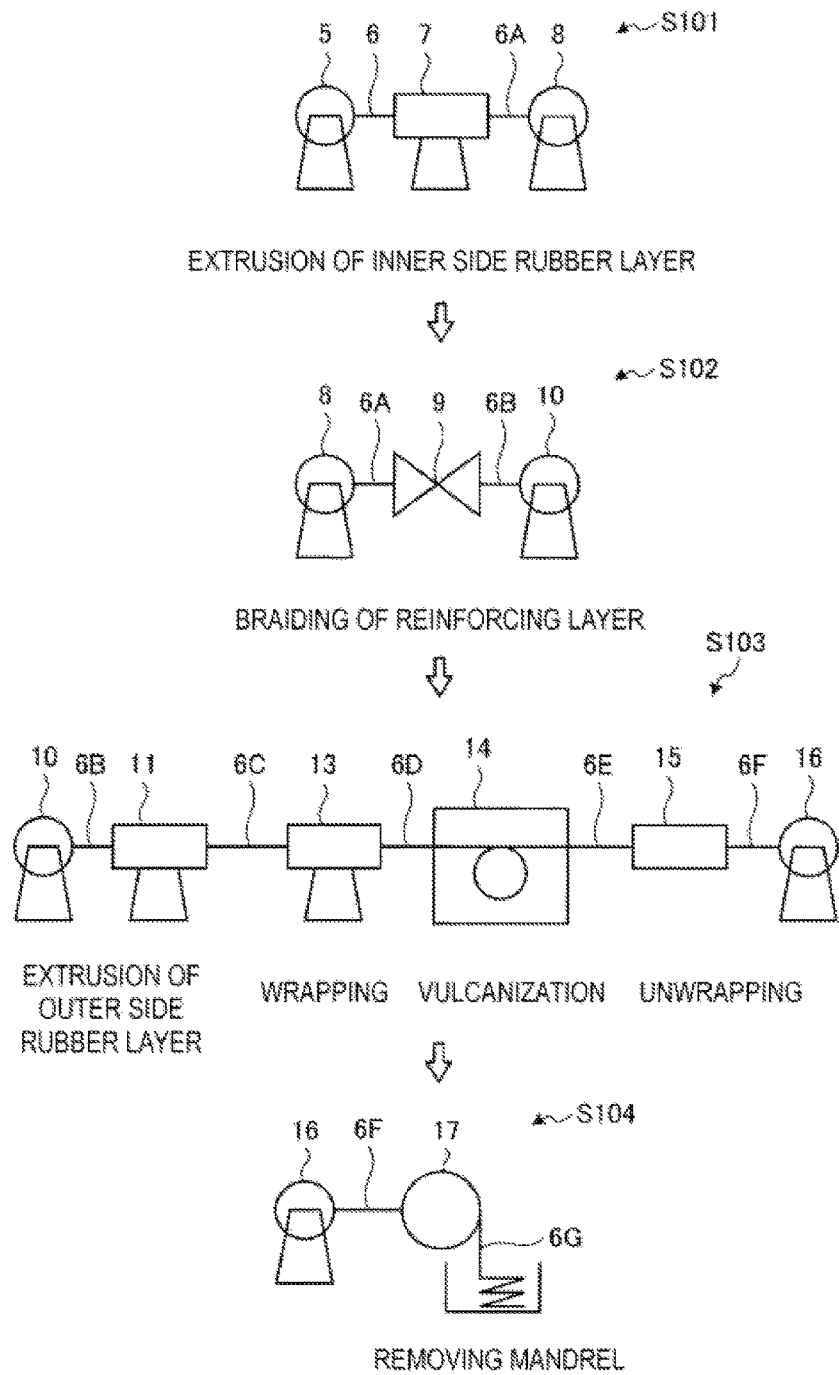
FIG. 2 is a flow chart illustrating an example of production of a hydraulic hose as a vulcanized rubber product.
Figure 3:
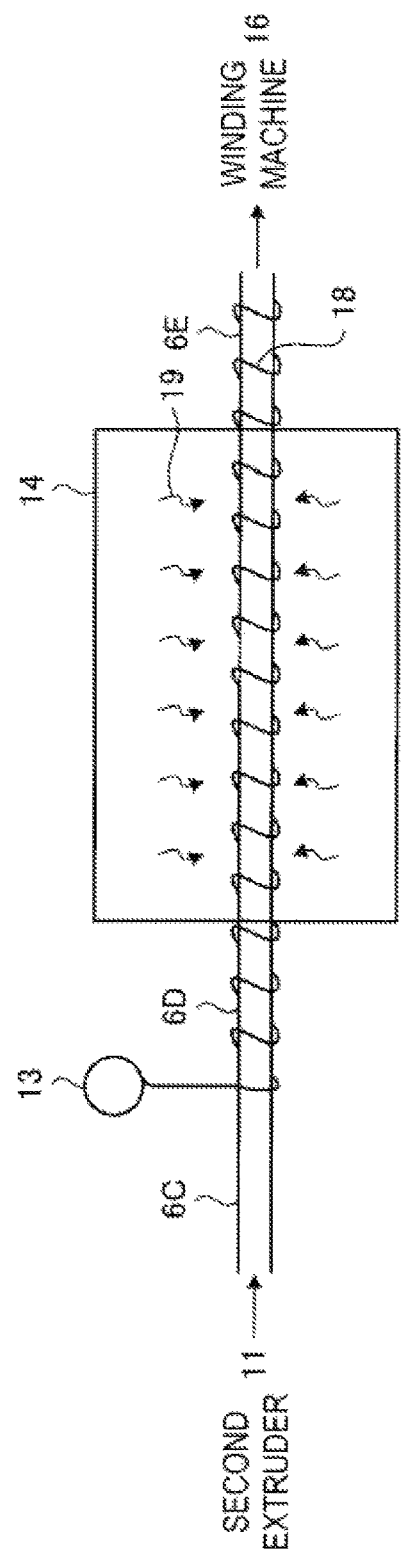
FIG. 3 is a schematic view illustrating the details of the vulcanization step in FIG. 2.

The method of producing a hydraulic hose according to the present embodiment will be described below with reference to FIGS. 2 and 3. FIG. 2 is a flow chart illustrating an example of the production device of the hydraulic hose. FIG. 3 is a schematic view illustrating the vulcanization step employing the vulcanization device 14 for the step S103 in FIG. 2 in more details.

<Steps of Producing Hose>

As illustrated in FIG. 2, the rubber hose is obtained by an extrusion step of a rubber material that forms the inner side rubber layer 2 on the peripheral surface of a mandrel 6 (step S101), a braiding step of the reinforcing layer 3 (step S102), an extrusion-vulcanization step of the outer side rubber layer 4 (step S103), and a removing step of mandrel 6 (step S104). The produced rubber hose is subjected to a water pressure test and a winding test step, and then packaged and shipped.

First, in the step S101, a hose 6A, which is formed by covering the peripheral surface of the mandrel 6 sent out from the unwinding machine 5 with an unvulcanized inner side rubber layer 2 using a first extruder 7, is wound by a winding-unwinding machine 8.

Next, in the step S102, a reinforcing layer 3 is braided by a braiding machine 9 in a manner that the inner side rubber layer 2 constituting the hose 6A sent out from the winding-unwinding machine 8 is covered, to form a hose 6B, and then the hose 6B is wound by the winding-unwinding machine 10. A metal wire is used as the cord of this reinforcing layer 3. As the metal wire, a steel wire plated with brass is used in order to impart excellent adhesion to rubber. Note that the reinforcing layer 3 may be formed by spirally winding the metal wire around the inner side rubber layer 2 that is formed around the mandrel 6.

Next, in the step S103, a hose body 6C is formed by covering the reinforcing layer 3 of the hose 6B sent out from the winding-unwinding machine 10 with an unvulcanized outer side rubber layer 4 using a second extruder 11, and the formed hose body 6C is wound by a winding machine 16. In the present embodiment, a vulcanized hose 6E is wound by the winding machine 16 with a vulcanization device 14 being provided after the hose body 6C is sent out from the second extruder 11 but before being wound to the winding machine 16; however, the vulcanization step can be performed after the hose body 6C is wound to the winding machine 16. Furthermore, before and after the vulcanization device 14, a wrapping device 13 and an unwrapping device 15 are provided in order to wrap or unwrap a protective cloth such as a nylon cloth around the hose body 6C. Note that, in FIG. 2, after the vulcanization, the unvulcanized hose 6D in which a nylon cloth is wrapped by the wrapping device 13 becomes a hose 6E that is in a state before having the nylon cloth unwrapped. The vulcanization step will be described below.

Next, in the step S104, a hose 6G is completed by removing the mandrel 6, using a mandrel removing device 17, from the hose 6F that is unwrapped after the vulcanization.

<Vulcanization Step>

As illustrated in FIG. 3, by the wrapping device 13, a nylon cloth 18 is wrapped around the hose body 6C sent out from the second extruder 11. The hose body 6C covered with the nylon cloth 18 is then transferred into the vulcanization device 14. The vulcanization device 14 is a continuous vulcanization device with hot-air circulation that allows the vulcanization to proceed by hot wind 19. The vulcanization method is an oven vulcanization method.

Figure 4:
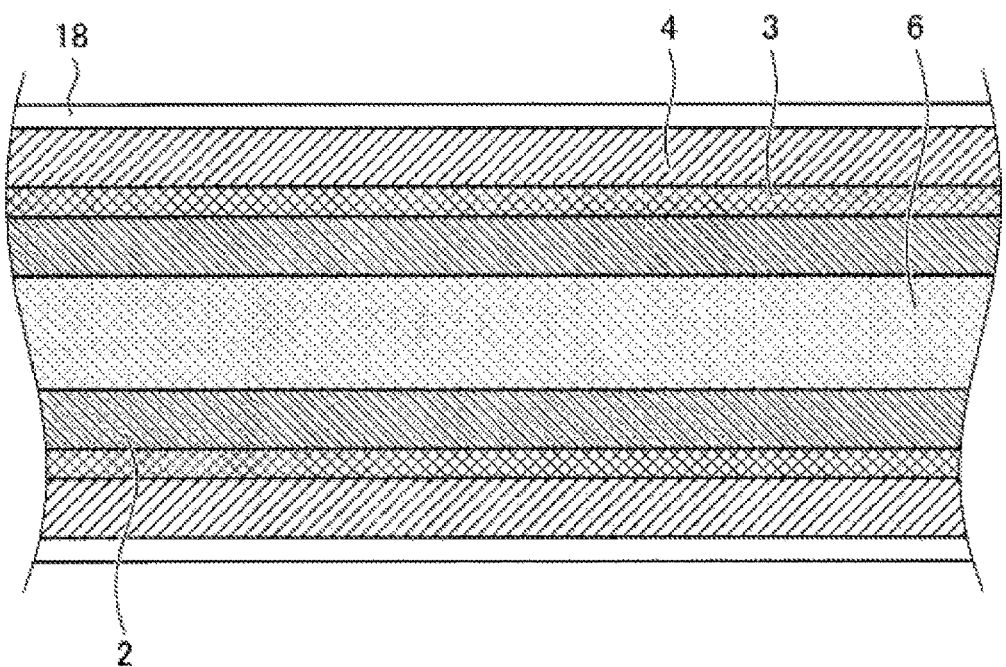
FIG. 4 is a partially cross-sectional view illustrating an example of a layer structure around a mandrel inserted into a vulcanization device in FIG. 2.

FIG. 4 is a partially cross-sectional view explaining an example of a layer structure around a mandrel 6 inserted into a vulcanization device. As illustrated in FIG. 4, the inner side rubber layer 2 is formed around the mandrel 6, the reinforcing layer 3 is further formed therearound, and the outer side rubber layer 4 is further formed therearound. The nylon cloth 18 is wrapped around the outer side rubber layer 4, and the outer side rubber layer 4 is heated in this condition to proceed the vulcanization step.

As described above, the vulcanization temperature is preferably from 130° C. to 180° C., and the vulcanization time (that is, the vulcanization time in the vulcanization device 14 is preferably from 30 minutes to 240 minutes. Using this temperature range and this vulcanization time, a hydraulic hose having excellent adhesion between the rubber layers and the reinforcing layer is obtained.

<Rubber Composition>

In the production steps of the hose, by forming at least one of the inner side rubber layer 2 or the outer side rubber layer 4 using the rubber composition, a hydraulic hose having excellent adhesion to a metal reinforcing layer can be produced.

Note that, according to the rubber composition, since a suitable water content can be stably maintained in the composition until immediately before the vulcanization, adhesion failure and decrease in adhesion due to insufficient water content can be suppressed even when an oven vulcanization method that causes great amount of water evaporation is used. The rubber composition according to the embodiment can be, needless to say, suitably used in a production of rubber products using conventionally known another vulcanization method. Examples of another vulcanization method include press vulcanization, steam vulcanization, hot water vulcanization, and the like.

Furthermore, in the embodiment described above, production steps of continuous treatment are exemplified; however, the vulcanized rubber products can be also produced by a method in which the rubber layer and the reinforcing layer are produced in separate steps and then adhered.

The hydraulic hose produced by the production method according to the present embodiment can be used in various applications. The hydraulic hose can be suitably used as, for example, air conditioner hose for vehicles, power steering hose, hydraulic hose for hydraulic systems of construction vehicles, and the like.

Furthermore, in the present embodiment, a hydraulic hose as a laminated body of the rubber composition and a metal and as a vulcanized rubber product has been explained; however, the present technology is not limited to this, and for example, the present technology can also be used in other rubber laminated bodies such as a conveyer belt.

As described above, according to the laminated body of the rubber composition and a metal, vulcanized rubber product, and method of producing the vulcanized rubber product, vulcanized rubber products having excellent adhesion between a rubber layer and a reinforcing layer can be provided even when a continuous production method with an oven vulcanization method is used. In particular, a composition that can form a rubber product having excellent adhesion toward a reinforcing layer can be provided even in the case where the composition is stored in a dried state for a long period of time. This vulcanized rubber product can be suitably used in a hydraulic hose, a high pressure hose, and the like.

EXAMPLES

The present technology is explained in further detail below by means of working examples, but is in no way restricted to these working examples.

1. Preparation of Rubber Composition

Working Examples 1 to 22

Rubber compositions according to Working Examples 1 to 22 were obtained by kneading the raw materials at the compounding ratios described in Table 1 and Table 2 using a Banbury mixer. Note that, unless otherwise noted, the unit for the values in the tables is "part by mass" in terms of the case where the total mass of the diene polymer is 100.

TABLE 1

|  |  | Working Example 1 | Working Example 2 | Working Example 3 | Working Example 4 | Working Example 5 | Working Example 6 |
|---|---|---|---|---|---|---|---|
| Diene polymer | NBR | 40 | 40 | 40 | 40 | 40 | 40 |
|  | EPDM | 30 | 30 | 30 | 30 | 30 | 30 |
|  | SBR | 30 | 30 | 30 | 30 | 30 | 30 |
|  | CR | — | — | — | — | — | — |
|  | Water absorbing resin 1 | 0.5 | 1 | 3 | 5 | 8 | 9 |
|  | Water absorbing resin 2 | — | — | — | — | — | — |
|  | Water absorbing resin 3 | — | — | — | — | — | — |
|  | Water absorbing resin 4 | — | — | — | — | — | — |
|  | Water | 6 | 3 | 12 | 3 | 12 | 15 |
| Vulcanizing agent | Sulfur | 2 | 2 | 2 | 2 | 2 | 2 |
| Other additives | Vulcanization accelerator 1 | 1.7 | 1.7 | 1.7 | 1.7 | 1.7 | 1.7 |
|  | Vulcanization accelerator 2 | — | — | — | — | — | — |
|  | Vulcanization accelerator 3 | — | — | — | — | — | — |
|  | Antiscorching agent | 0.3 | 0.3 | 0.3 | 0.3 | 0.3 | 0.3 |

TABLE 1-continued

|  |  |  |  |  |  |  |  |
|---|---|---|---|---|---|---|---|
|  | ISAF grade carbon black | 62 | 62 | 62 | 62 | 62 | 62 |
|  | FEF grade carbon black | — | — | — | — | — | — |
|  | Hard clay | 15 | 15 | 15 | 15 | 15 | 15 |
|  | Zinc Oxide #3 | 5 | 5 | 5 | 5 | 5 | 5 |
|  | Magnesium oxide | — | — | — | — | — | — |
|  | Stearic acid | 1 | 1 | 1 | 1 | 1 | 1 |
|  | Antiozonant | 2.4 | 2.4 | 2.4 | 2.4 | 2.4 | 2.4 |
|  | Plasticizer | 10 | 10 | 10 | 10 | 10 | 10 |
|  | Process oil | 12 | 12 | 12 | 12 | 12 | 12 |

|  |  | Working Example 7 | Working Example 8 | Working Example 9 | Working Example 10 | Working Example 11 |
|---|---|---|---|---|---|---|
| Diene polymer | NBR | 40 | 40 | 40 | 40 | — |
|  | EPDM | 30 | 30 | 30 | 30 | — |
|  | SBR | 30 | 30 | 30 | 30 | 35 |
|  | CR | — | — | — | — | 65 |
|  | Water absorbing resin 1 | — | — | — | — | 2 |
|  | Water absorbing resin 2 | 0.5 | 2 | — | — | — |
|  | Water absorbing resin 3 | — | — | 2 | — | — |
|  | Water absorbing resin 4 | — | — | — | 5 | — |
|  | Water | 6 | 6 | 2 | 5 | 2 |
| Vulcanizing agent | Sulfur | 2 | 2 | 2 | 2 | 0.8 |
| Other additives | Vulcanization accelerator 1 | 1.7 | 1.7 | 1.7 | 1.7 | — |
|  | Vulcanization accelerator 2 | — | — | — | — | 0.8 |
|  | Vulcanization accelerator 3 | — | — | — | — | 0.8 |
|  | Antiscorching agent | 0.3 | 0.3 | 0.3 | 0.3 | — |
|  | ISAF grade carbon black | 62 | 62 | 62 | 62 | — |
|  | FEF grade carbon black | — | — | — | — | 90 |
|  | Hard clay | 15 | 15 | 15 | 15 | — |
|  | Zinc Oxide #3 | 5 | 5 | 5 | 5 | 5 |
|  | Magnesium oxide | — | — | — | — | 3 |
|  | Stearic acid | 1 | 1 | 1 | 1 | 2 |
|  | Antiozonant | 2.4 | 2.4 | 2.4 | 2.4 | 2.0 |
|  | Plasticizer | 10 | 10 | 10 | 10 | — |
|  | Process oil | 12 | 12 | 12 | 12 | 25 |

TABLE 2

|  |  | Working Example 12 | Working Example 13 | Working Example 14 | Working Example 15 | Working Example 16 | Working Example 17 |
|---|---|---|---|---|---|---|---|
| Diene polymer | NBR | 40 | 40 | 40 | 40 | 40 | 40 |
|  | EPDM | 30 | 30 | 30 | 30 | 30 | 30 |
|  | SBR | 30 | 30 | 30 | 30 | 30 | 30 |
|  | CR | — | — | — | — | — | — |
| Inorganic water retaining agent | Water-swellable clay | 0.5 | 1 | 3 | 8 | 15 | 20 |
|  | Wet method silica | — | — | — | — | — | — |
|  | Aluminum hydroxide | — | — | — | — | — | — |
|  | Magnesium carbonate | — | — | — | — | — | — |
|  | Water | 6 | 3 | 12 | 5 | 6 | 12 |
| Vulcanizing agent | Sulfur | 2 | 2 | 2 | 2 | 2 | 2 |
| Other additives | Vulcanization accelerator 1 | 1.7 | 1.7 | 1.7 | 1.7 | 1.7 | 1.7 |
|  | Vulcanization accelerator 2 | — | — | — | — | — | — |
|  | Vulcanization accelerator 3 | — | — | — | — | — | — |
|  | Antiscorching agent | 0.3 | 0.3 | 0.3 | 0.3 | 0.3 | 0.3 |
|  | ISAF grade carbon black | 62 | 62 | 62 | 62 | 62 | 62 |
|  | FEF grade carbon black | — | — | — | — | — | — |
|  | Hard clay | 15 | 15 | 15 | 15 | 15 | 15 |
|  | Zinc Oxide #3 | 5 | 5 | 5 | 5 | 5 | 5 |
|  | Magnesium oxide | — | — | — | — | — | — |
|  | Stearic acid | 1 | 1 | 1 | 1 | 1 | 1 |
|  | Antiozonant | 2.4 | 2.4 | 2.4 | 2.4 | 2.4 | 2.4 |

TABLE 2-continued

|  |  |  |  |  |  |  |  |
|---|---|---|---|---|---|---|---|
|  | Plasticizer | 10 | 10 | 10 | 10 | 10 | 10 |
|  | Process oil | 12 | 12 | 12 | 12 | 12 | 12 |

|  |  | Working Example 18 | Working Example 19 | Working Example 20 | Working Example 21 | Working Example 22 |
|---|---|---|---|---|---|---|
| Diene polymer | NBR | 40 | 40 | 40 | 40 | — |
|  | EPDM | 30 | 30 | 30 | 30 | — |
|  | SBR | 30 | 30 | 30 | 30 | 35 |
|  | CR | — | — | — | — | 65 |
| Inorganic water retaining agent | Water-swellable clay | — | — | — | — | 3 |
|  | Wet method silica | 5 | 15 | — | — | — |
|  | Aluminum hydroxide | — | — | 8 | — | — |
|  | Magnesium carbonate | — | — | — | 8 | — |
|  | Water | 6 | 6 | 5 | 5 | 2 |
| Vulcanizing agent | Sulfur | 2 | 2 | 2 | 2 | 0.8 |
| Other additives | Vulcanization accelerator 1 | 1.7 | 1.7 | 1.7 | 1.7 | — |
|  | Vulcanization accelerator 2 | — | — | — | — | 0.8 |
|  | Vulcanization accelerator 3 | — | — | — | — | 0.8 |
|  | Antiscorching agent | 0.3 | 0.3 | 0.3 | 0.3 | — |
|  | ISAF grade carbon black | 62 | 62 | 62 | 62 | — |
|  | FEF grade carbon black | — | — | — | — | 90 |
|  | Hard clay | 15 | 15 | 15 | 15 | — |
|  | Zinc Oxide #3 | 5 | 5 | 5 | 5 | 5 |
|  | Magnesium oxide | — | — | — | — | 3 |
|  | Stearic acid | 1 | 1 | 1 | 1 | 2 |
|  | Antiozonant | 2.4 | 2.4 | 2.4 | 2.4 | 2 |
|  | Plasticizer | 10 | 10 | 10 | 10 | — |
|  | Process oil | 12 | 12 | 12 | 12 | 25 |

Comparative Examples 1 to 14

Rubber compositions according to Comparative Examples 1 to 14 were obtained by kneading the raw materials at the compounding ratios described in Table 3 and Table 4 using a Banbury mixer. Note that, unless otherwise noted, the unit for the values in the tables is "part by mass" in terms of the case where the total mass of the diene polymer is 100.

TABLE 3

|  |  | Comparative Example 1 | Comparative Example 2 | Comparative Example 3 | Comparative Example 4 |
|---|---|---|---|---|---|
| Diene polymer | NBR | 40 | 40 | 40 | 40 |
|  | EPDM | 30 | 30 | 30 | 30 |
|  | SBR | 30 | 30 | 30 | 30 |
|  | CR | — | — | — | — |
|  | Water absorbing resin 1 | — | — | — | 12 |
|  | Water absorbing resin 2 | — | — | — | — |
|  | Water absorbing resin 3 | — | — | — | — |
|  | Water absorbing resin 4 | — | — | — | — |
|  | Water | — | 6 | 15 | 10 |
| Vulcanizing agent | Sulfur | 2 | 2 | 2 | 2 |
| Other additives | Vulcanization accelerator 1 | 1.7 | 1.7 | 1.7 | 1.7 |
|  | Vulcanization accelerator 2 | — | — | — | — |
|  | Vulcanization accelerator 3 | — | — | — | — |
|  | Antiscorching agent | 0.3 | 0.3 | 0.3 | 0.3 |
|  | ISAF grade carbon black | 62 | 62 | 62 | 62 |
|  | FEF grade carbon black | — | — | — | — |
|  | Hard clay | 15 | 15 | 15 | 15 |
|  | Zinc Oxide #3 | 5 | 5 | 5 | 5 |
|  | Magnesium oxide | — | — | — | — |
|  | Stearic acid | 1 | 1 | 1 | 1 |
|  | Antiozonant | 2.4 | 2.4 | 2.4 | 2.4 |

TABLE 3-continued

|  |  |  |  |  |  |
|---|---|---|---|---|---|
|  | Plasticizer | 10 | 10 | 10 | 10 |
|  | Process oil | 12 | 12 | 12 | 12 |

|  |  | Comparative Example 5 | Comparative Example 6 | Comparative Example 7 |
|---|---|---|---|---|
| Diene polymer | NBR | 40 | — | — |
|  | EPDM | 30 | — | — |
|  | SBR | 30 | 35 | 35 |
|  | CR | — | 65 | 65 |
| Water absorbing resin 1 |  | — | — | 12 |
| Water absorbing resin 2 |  | 12 | — | — |
| Water absorbing resin 3 |  | — | — | — |
| Water absorbing resin 4 |  | — | — | — |
|  | Water | 10 | 2 | 10 |
| Vulcanizing agent | Sulfur | 2 | 0.8 | 0.8 |
| Other additives | Vulcanization accelerator 1 | 1.7 | — | — |
|  | Vulcanization accelerator 2 | — | 0.8 | 0.8 |
|  | Vulcanization accelerator 3 | — | 0.8 | 0.8 |
|  | Antiscorching agent | 0.3 | — | — |
|  | ISAF grade carbon black | 62 | — | — |
|  | FEF grade carbon black | — | 90 | 90 |
|  | Hard clay | 15 | — | — |
|  | Zinc Oxide #3 | 5 | 5 | 5 |
|  | Magnesium oxide | — | 3 | 3 |
|  | Stearic acid | 1 | 2 | 2 |
|  | Antiozonant | 2.4 | 2.0 | 2.0 |
|  | Plasticizer | 10 | — | — |
|  | Process oil | 12 | 25 | 25 |

TABLE 4

|  |  | Comparative Example 8 | Comparative Example 9 | Comparative Example 10 | Comparative Example 11 |
|---|---|---|---|---|---|
| Diene polymer | NBR | 40 | 40 | 40 | 40 |
|  | EPDM | 30 | 30 | 30 | 30 |
|  | SBR | 30 | 30 | 30 | 30 |
|  | CR | — | — | — | — |
| Inorganic water retaining agent | Water-swellable clay | — | — | — | 25 |
|  | Wet method silica | — | — | — | — |
|  | Aluminum hydroxide | — | — | — | — |
|  | Magnesium carbonate | — | — | — | — |
| Water |  | — | 6 | 15 | 10 |
| Vulcanizing agent | Sulfur | 2 | 2 | 2 | 2 |
| Other additives | Vulcanization accelerator 1 | 1.7 | 1.7 | 1.7 | 1.7 |
|  | Vulcanization accelerator 2 | — | — | — | — |
|  | Vulcanization accelerator 3 | — | — | — | — |
|  | Antiscorching agent | 0.3 | 0.3 | 0.3 | 0.3 |
|  | ISAF grade carbon black | 62 | 62 | 62 | 62 |
|  | FEF grade carbon black | — | — | — | — |
|  | Hard clay | 15 | 15 | 15 | 15 |
|  | Zinc Oxide #3 | 5 | 5 | 5 | 5 |
|  | Magnesium oxide | — | — | — | — |
|  | Stearic acid | 1 | 1 | 1 | 1 |
|  | Antiozonant | 2.4 | 2.4 | 2.4 | 2.4 |

TABLE 4-continued

| | | | | | |
|---|---|---|---|---|---|
| Plasticizer | | 10 | 10 | 10 | 10 |
| Process oil | | 12 | 12 | 12 | 12 |

| | | Comparative Example 12 | Comparative Example 13 | Comparative Example 14 |
|---|---|---|---|---|
| Diene polymer | NBR | 40 | — | — |
| | EPDM | 30 | — | — |
| | SBR | 30 | 35 | 35 |
| | CR | — | 65 | 65 |
| Inorganic water retaining agent | Water-swellable clay | — | — | — |
| | Wet method silica | 25 | — | — |
| | Aluminum hydroxide | — | — | — |
| | Magnesium carbonate | — | — | 25 |
| | Water | 18 | 2 | 18 |
| Vulcanizing agent | Sulfur | 2 | 0.8 | 0.8 |
| Other additives | Vulcanization accelerator 1 | 1.7 | — | — |
| | Vulcanization accelerator 2 | — | 0.8 | 0.8 |
| | Vulcanization accelerator 3 | — | 0.8 | 0.8 |
| | Antiscorching agent | 0.3 | — | — |
| | ISAF grade carbon black | 62 | — | — |
| | FEF grade carbon black | — | 90 | 90 |
| | Hard clay | 15 | — | — |
| | Zinc Oxide #3 | 5 | 5 | 5 |
| | Magnesium oxide | — | 3 | 3 |
| | Stearic acid | 1 | 2 | 2 |
| | Antiozonant | 2.4 | 2 | 2 |
| | Plasticizer | 10 | — | — |
| | Process oil | 12 | 25 | 25 |

Details of each of the components listed in Tables 1 to 4 are as described below.

NBR: trade name: Nancar 3345, manufactured by Nantex Industry Co., Ltd.; acrylonitrile content: 34% by mass; Mooney viscosity (ML1+4, 100° C.): 45

EPDM: trade name: EPT 4070, manufactured by Mitsui Chemicals, Inc.; ethylene content: 56% by mass; ethylidene norbornane content: 8% by mass; Mooney viscosity (ML1+4, 125° C.): 47

SBR: trade name: Nipol 1502, manufactured by Zeon Corporation; emulsion polymerization SBR; bonding styrene content: 23.5% by mass; Mooney viscosity (ML1+4, 100° C.): 52

CR: trade name: Denka Chloroprene S-41, manufactured by Denki Kagaku Kogyo K.K; non-sulfur-modified chloroprene rubber; Mooney viscosity (ML1+4, 100, 48° C.): 48

Water absorbing resin 1: poly(acrylic acid) sodium neutralized salt crosslinked product; trade name: AQUALIC CA-K4, manufactured by Nippon Shokubai Co., Ltd.

Water absorbing resin 2: modified acrylic crosslinked polymer; trade name: AQUALIC CS-6S, manufactured by Nippon Shokubai Co., Ltd.

Water absorbing resin 3: polyalkylene oxide; trade name: AQUA CALK TW, manufactured by Sumitomo Seika Chemicals Co., Ltd.

Water absorbing resin 4: polyethylene glycol; trade name: MACROGOL 6000P, manufactured by Sanyo Chemical Industries, Ltd.

Water-swellable clay: trade name: BENCLAY MK-101H, manufactured by Mizusawa Industrial Chemicals, Ltd.

Wet method silica: trade name: Nipsil AQ, manufactured by Tosoh Silica Corporation Aluminum hydroxide: trade name: HIGILITE H-42M, manufactured by Shepherd Chemical Magnesium carbonate: trade name: magnesium carbonate TT, manufactured by Naikai Salt Industries Co., Ltd.

Water: tap water

Sulfur: manufactured by Hosoi Chemical Industry Co., Ltd.

Vulcanization accelerator 1: N-t-butylbenzothiazol-2-sulfenamide; trade name: NOCCELER NS-P, manufactured by Ouchi Shinko Chemical Industrial Co., Ltd.

Vulcanization accelerator 2: tetramethylthiuram monosulfide; trade name: Sanceler TS-G, manufactured by Sanshin Chemical Industry Co., Ltd.

Vulcanization accelerator 3: diphenylguanidine; trade name: Soxinol D-G, manufactured by Sumitomo Chemical Co., Ltd.

Antiscorching agent: N-cyclohexylthiophthalimide, manufactured by FLEXSYS

ISAF grade carbon black: trade name: Shoblack N220, manufactured by Showa Cabot K.K.

FEF grade carbon black: trade name: HTC#100, manufactured by NSCC Carbon Co., Ltd.

Hard clay: trade name: Suprex Clay, manufactured by Kentucky-Tennessee Clay Company Zinc Oxide III: manufactured by Seido Chemical Industry Co., Ltd.

Magnesium oxide: trade name: Kyowa Mag 150, manufactured by Kyowa Chemical Industry Co., Ltd.

Stearic acid: manufactured by Nippon Oil & Fats Co., Ltd.

Antiozonant: trade name: Ozonone 6C, manufactured by Seiko Chemical Co., Ltd.

Plasticizer: dioctyl adipate; trade name: DIACIZER DOA, manufactured by Mitsubishi Kasei Vinyl Company Process oil: aromatic oil; trade name: A-OMIX, manufactured by Sankyo Yuka Kogyo K.K.

2. Evaluation of Rubber Composition

A hose-shaped test piece was produced as described below by adhering the rubber composition obtained in each of Working Examples 1 to 22 and Comparative Examples 1 to 14 as an outer side rubber layer to a reinforcing layer produced using a brass-plated wire braid.

First, wires having a surface plated with brass were wound, in a manner that forms a braid, around a mandrel having an outer diameter of 34 mm to form a reinforcing layer. Next, an unvulcanized sheet having a thickness of 2.5 mm that was prepared from each of the obtained rubber compositions was bonded onto the reinforcing layer to obtain an unvulcanized hose-shaped test piece. Thereafter, curing tape (protective cloth) made from nylon 66 was wrapped to cover the outer side of the unvulcanized hose-shaped test piece to perform vulcanization.

Vulcanization was performed under the following four types of conditions, and adhesive strength and rubber sticking of the obtained vulcanized hose-shaped test pieces were evaluated. Note that the evaluation results for adhesive strength and rubber sticking were average values of ten measurements.

(Vulcanization Conditions)

Vulcanization conditions 1: an unvulcanized hose-shaped test piece that was produced by using a rubber composition immediately after the kneading was vulcanized in a steam can at 142° C. for 90 minutes (steam vulcanization).

Vulcanization conditions 2: an unvulcanized hose-shaped test piece that was produced by using a rubber composition immediately after the kneading was vulcanized in an oven at normal pressure at 142° C. for 135 minutes (oven vulcanization).

Vulcanization conditions 3: after storing an unvulcanized hose-shaped test piece in dried conditions of 55% relative humidity (% RH) at 25° C. for 2 weeks, the unvulcanized hose-shaped test piece was vulcanized in an oven at normal pressure at 142° C. for 135 minutes (oven vulcanization).

Vulcanization conditions 4: after storing an unvulcanized hose-shaped test piece in dried conditions of 30% relative humidity (% RH) at 25° C. for 4 weeks, the unvulcanized hose-shaped test piece was vulcanized in an oven at normal pressure at 142° C. for 135 minutes (oven vulcanization).

[Adhesive Strength and Rubber Sticking]

For each of the vulcanized hose-shaped test pieces obtained by the vulcanization conditions described above, adhesive strength (kN/m) and rubber sticking (%) were evaluated. Here, "adhesive strength" (kN/m) refers to a degree of strength (kN) per unit width (m) required to peel off an outer side rubber layer from the interface between the outer side rubber layer and a reinforcing layer at a peeling rate of 50 mm/minute. Here, "rubber sticking" refers to a proportion of the outer side rubber layer of the vulcanized hose-shaped test piece remaining on the reinforcing layer surface, and is indicated as a percentage of area ratio of the remained rubber layer relative to the entire surface area of the reinforcing layer.

The measurement results for the adhesive strength and the rubber sticking are shown in Tables 5 to 8. The adhesion tests 1 to 4 in Tables 5 to 8 correspond to the test results for the test pieces produced in the vulcanization conditions 1 to 4 described above. When the adhesive strength is 2.5 kN/m or greater and the rubber sticking is 60% or greater, the adhesion between the outer side rubber layer and the reinforcing layer is deemed to be good.

Furthermore, the mixability/processability of rubber of each composition during the kneading was evaluated based on the following criteria. The evaluation results for Working Examples 1 to 22 are shown in Tables 5 and 6, and the evaluation results for Comparative Examples 1 to 14 are shown in Tables 7 and 8.

◯: Good cohesion

Δ: Merely satisfactory cohesion x: Bad cohesion

Furthermore, for each of the vulcanized hose-shaped test pieces, the appearance of the outer side rubber layer was visually evaluated based on the following criteria. The evaluation results for Working Examples 1 to 22 are shown in Tables 5 and 6, and the evaluation results for Comparative Examples 1 to 14 are shown in Tables 7 and 8.

◯: No concave defect (porous) was observed.

x: Concave defects (porous) were observed.

TABLE 5

|  |  | Working Example 1 | Working Example 2 | Working Example 3 | Working Example 4 | Working Example 5 | Working Example 6 |
|---|---|---|---|---|---|---|---|
| Adhesion test 1 | Adhesive strength (kN/m) | 4.2 | 4.6 | 4.5 | 4.5 | 3.7 | 3.0 |
|  | Rubber sticking (%) | 95 | 100 | 100 | 100 | 90 | 75 |
| Adhesion test 2 | Adhesive strength (kN/m) | 4.0 | 4.1 | 4.1 | 3.9 | 3.8 | 2.9 |
|  | Rubber sticking (%) | 90 | 95 | 95 | 95 | 90 | 65 |
| Adhesion test 3 | Adhesive strength (kN/m) | 3.6 | 4.0 | 4.0 | 3.8 | 3.8 | 2.8 |
|  | Rubber sticking (%) | 70 | 90 | 95 | 95 | 85 | 65 |
| Adhesion test 4 | Adhesive strength (kN/m) | 3.5 | 3.8 | 3.8 | 3.8 | 3.7 | 2.7 |
|  | Rubber sticking (%) | 65 | 87.5 | 90 | 90 | 80 | 60 |
| Rubber mixability/processability |  | ◯ | ◯ | ◯ | ◯ | ◯ | ◯ |
| Rubber appearance |  | ◯ | ◯ | ◯ | ◯ | ◯ | ◯ |

TABLE 5-continued

|  |  | Working Example 7 | Working Example 8 | Working Example 9 | Working Example 10 | Working Example 11 |
|---|---|---|---|---|---|---|
| Adhesion test 1 | Adhesive strength (kN/m) | 4.4 | 4.6 | 4.4 | 4.5 | 3.4 |
|  | Rubber sticking (%) | 100 | 100 | 100 | 100 | 90 |
| Adhesion test 2 | Adhesive strength (kN/m) | 4.4 | 4.5 | 3.9 | 4.1 | 3.1 |
|  | Rubber sticking (%) | 95 | 95 | 95 | 100 | 90 |
| Adhesion test 3 | Adhesive strength (kN/m) | 4.1 | 4.0 | 3.8 | 4.0 | 3.1 |
|  | Rubber sticking (%) | 95 | 95 | 95 | 95 | 90 |
| Adhesion test 4 | Adhesive strength (kN/m) | 3.8 | 3.9 | 3.6 | 4.0 | 2.9 |
|  | Rubber sticking (%) | 90 | 90 | 90 | 95 | 90 |
| Rubber mixability/processability |  | ○ | ○ | ○ | ○ | ○ |
| Rubber appearance |  | ○ | ○ | ○ | ○ | ○ |

Adhesion test 1: Steam vulcanization adhesion between newly kneaded rubber and brass-plated wires
Adhesion test 2: Oven vulcanization adhesion between newly kneaded rubber and brass-plated wires
Adhesion test 3: Oven vulcanization adhesion after storing an unvulcanized rubber in dried conditions at 25° C. and 55 RH % for 2 weeks
Adhesion test 4: Oven vulcanization adhesion after storing an unvulcanized rubber in dried conditions at 25° C. and 30 RH % for 4 weeks
Rubber mixability/processability: Rubber mixability/processability was evaluated as follows: good cohesion: ○, merely satisfactory cohesion: Δ, and bad cohesion: x.
Rubber appearance: Appearance of hose cover rubber was evaluated as follows: absence of pore: ○, and presence of pore: x.

TABLE 6

|  |  | Working Example 12 | Working Example 13 | Working Example 14 | Working Example 15 | Working Example 16 | Working Example 17 |
|---|---|---|---|---|---|---|---|
| Adhesion test 1 | Adhesive strength (kN/m) | 4.3 | 4.5 | 4.6 | 4.5 | 4.3 | 4.2 |
|  | Rubber sticking (%) | 100 | 100 | 100 | 100 | 100 | 85 |
| Adhesion test 2 | Adhesive strength (kN/m) | 4.0 | 4.1 | 4.1 | 4.0 | 4.1 | 4.0 |
|  | Rubber sticking (%) | 90 | 95 | 100 | 100 | 100 | 85 |
| Adhesion test 3 | Adhesive strength (kN/m) | 3.6 | 4.0 | 4.0 | 3.9 | 3.8 | 3.8 |
|  | Rubber sticking (%) | 70 | 90 | 95 | 95 | 95 | 85 |
| Adhesion test 4 | Adhesive strength (kN/m) | 3.5 | 3.9 | 3.9 | 3.8 | 3.7 | 3.6 |
|  | Rubber sticking (%) | 65 | 90 | 95 | 95 | 95 | 80 |
| Rubber mixability/processability |  | ○ | ○ | ○ | ○ | ○ | ○ |
| Rubber appearance |  | ○ | ○ | ○ | ○ | ○ | ○ |

|  |  | Working Example 18 | Working Example 19 | Working Example 20 | Working Example 21 | Working Example 22 |
|---|---|---|---|---|---|---|
| Adhesion test 1 | Adhesive strength (kN/m) | 4.4 | 4.4 | 4.1 | 4.2 | 3.5 |
|  | Rubber sticking (%) | 100 | 100 | 100 | 100 | 95 |
| Adhesion test 2 | Adhesive strength (kN/m) | 4.2 | 4.2 | 3.6 | 3.7 | 3.2 |
|  | Rubber sticking (%) | 100 | 100 | 100 | 100 | 95 |
| Adhesion test 3 | Adhesive strength (kN/m) | 4.1 | 4.0 | 3.5 | 3.6 | 3.2 |
|  | Rubber sticking (%) | 95 | 95 | 90 | 90 | 95 |
| Adhesion test 4 | Adhesive strength (kN/m) | 3.9 | 3.9 | 3.4 | 3.5 | 3.0 |
|  | Rubber sticking (%) | 95 | 95 | 90 | 90 | 90 |
| Rubber mixability/processability |  | ○ | ○ | ○ | ○ | ○ |
| Rubber appearance |  | ○ | ○ | ○ | ○ | ○ |

Adhesion test 1: Steam vulcanization adhesion between newly kneaded rubber and brass-plated wires
Adhesion test 2: Oven vulcanization adhesion between newly kneaded rubber and brass-plated wires
Adhesion test 3: Oven vulcanization adhesion after storing an unvulcanized rubber in dried conditions at 25° C. and 55 RH % for 2 weeks
Adhesion test 4: Oven vulcanization adhesion after storing an unvulcanized rubber in dried conditions at 25° C. and 30 RH % for 4 weeks
Rubber mixability/processability: Rubber mixability/processability was evaluated as follows: good cohesion: ○, merely satisfactory cohesion: Δ, and bad cohesion: x.
Rubber appearance: Appearance of hose cover rubber was evaluated as follows: absence of pore: ○, and presence of pore: x.

TABLE 7

|  |  | Comparative Example 1 | Comparative Example 2 | Comparative Example 3 | Comparative Example 4 |
|---|---|---|---|---|---|
| Adhesion test 1 | Adhesive strength (kN/m) | 4.4 | 4.2 | 4.1 | 2.8 |
|  | Rubber sticking (%) | 100 | 100 | 95 | 60 |
| Adhesion test 2 | Adhesive strength (kN/m) | 1.6 | 3.9 | 3.9 | 2.4 |
|  | Rubber sticking (%) | 0 | 85 | 85 | 35 |
| Adhesion test 3 | Adhesive strength (kN/m) | 1.6 | 2.1 | 2.4 | 2.7 |
|  | Rubber sticking (%) | 0 | 35 | 40 | 35 |
| Adhesion test 4 | Adhesive strength (kN/m) | 1.6 | 1.8 | 1.9 | 2.2 |
|  | Rubber sticking (%) | 0 | 25 | 35 | 5.0 |
| Rubber mixability/processability | | ○ | ○ | Δ | x |
| Rubber appearance | | ○ | ○ | ○ | x |

|  |  | Comparative Example 5 | Comparative Example 6 | Comparative Example 7 |
|---|---|---|---|---|
| Adhesion test 1 | Adhesive strength (kN/m) | 3.2 | 3.5 | 2.7 |
|  | Rubber sticking (%) | 65 | 95 | 70 |
| Adhesion test 2 | Adhesive strength (kN/m) | 2.2 | 3.1 | 2.5 |
|  | Rubber sticking (%) | 30 | 95 | 45 |
| Adhesion test 3 | Adhesive strength (kN/m) | 2.7 | 2.8 | 2.2 |
|  | Rubber sticking (%) | 35 | 80 | 25 |
| Adhesion test 4 | Adhesive strength (kN/m) | 2.0 | 2.4 | 2.0 |
|  | Rubber sticking (%) | 5.0 | 45 | 10 |
| Rubber mixability/processability | | x | ○ | x |
| Rubber appearance | | x | ○ | x |

Adhesion test 1: Steam vulcanization adhesion between newly kneaded rubber and brass-plated wires
Adhesion test 2: Oven vulcanization adhesion between newly kneaded rubber and brass-plated wires
Adhesion test 3: Oven vulcanization adhesion after storing an unvulcanized rubber in dried conditions at 25° C. and 55 RH % for 2 weeks
Adhesion test 4: Oven vulcanization adhesion after storing an unvulcanized rubber in dried conditions at 25° C. and 30 RH % for 4 weeks
Rubber mixability/processability: Rubber mixability/processability was evaluated as follows: good cohesion: ○, merely satisfactory cohesion: Δ, and bad cohesion: x.
Rubber appearance: Appearance of hose cover rubber was evaluated as follows: absence of pore: ○, and presence of pore: x.

TABLE 8

|  |  | Comparative Example 8 | Comparative Example 9 | Comparative Example 10 | Comparative Example 11 |
|---|---|---|---|---|---|
| Adhesion test 1 | Adhesive strength (kN/m) | 4.4 | 4.2 | 4.1 | 3.6 |
|  | Rubber sticking (%) | 100 | 100 | 95 | 75 |
| Adhesion test 2 | Adhesive strength (kN/m) | 1.6 | 3.9 | 3.9 | 2.8 |
|  | Rubber sticking (%) | 0 | 85 | 85 | 40 |
| Adhesion test 3 | Adhesive strength (kN/m) | 1.6 | 2.1 | 2.4 | 2.7 |
|  | Rubber sticking (%) | 0 | 35 | 40 | 35 |
| Adhesion test 4 | Adhesive strength (kN/m) | 1.6 | 1.8 | 1.9 | 2.2 |
|  | Rubber sticking (%) | 0 | 25 | 30 | 35 |
| Rubber mixability/processability | | ○ | ○ | Δ | x |
| Rubber appearance | | ○ | ○ | ○ | x |

|  |  | Comparative Example 12 | Comparative Example 13 | Comparative Example 14 |
|---|---|---|---|---|
| Adhesion test 1 | Adhesive strength (kN/m) | 3.2 | 3.5 | 2.8 |
|  | Rubber sticking (%) | 65 | 95 | 70 |
| Adhesion test 2 | Adhesive strength (kN/m) | 2.5 | 3.1 | 2.6 |
|  | Rubber sticking (%) | 35 | 95 | 45 |

TABLE 8-continued

| | | | | |
|---|---|---|---|---|
| Adhesion test 3 | Adhesive strength (kN/m) | 2.3 | 2.8 | 2.5 |
| | Rubber sticking (%) | 30 | 80 | 40 |
| Adhesion test 4 | Adhesive strength (kN/m) | 1.9 | 2.4 | 2.1 |
| | Rubber sticking (%) | 25 | 45 | 30 |
| Rubber mixability/processability | | x | ○ | x |
| Rubber appearance | | x | ○ | x |

Adhesion test 1: Steam vulcanization adhesion between newly kneaded rubber and brass-plated wires
Adhesion test 2: Oven vulcanization adhesion between newly kneaded rubber and brass-plated wires
Adhesion test 3: Oven vulcanization adhesion after storing an unvulcanized rubber in dried conditions at 25° C. and 55 RH % for 2 weeks
Adhesion test 4: Oven vulcanization adhesion after storing an unvulcanized rubber in dried conditions at 25° C. and 30 RH % for 4 weeks
Rubber mixability/processability: Rubber mixability/processability was evaluated as follows: good cohesion: ○, merely satisfactory cohesion: Δ, and bad cohesion: x.
Rubber appearance: Appearance of hose cover rubber was evaluated as follows: absence of pore: ○, and presence of pore: x.

As is clear from Tables 5 and 6, the compositions of Working Examples 1 to 22 exhibited good rubber mixability/processability, that is, the cohesion of the rubber compositions after kneading by a Banbury mixer was good. Furthermore, for the rubber appearance after the vulcanization, no pore was observed and the appearance was good. Furthermore, all the vulcanized hose-shaped test pieces produced by using the compositions of Working Examples 1 to 22 exhibited the adhesion strength to a reinforcing layer of 2.5 kN/m or greater and the rubber sticking of 60% or greater. Furthermore, all the vulcanized hose-shaped test pieces produced by using the compositions of Working Examples 1 to 22 exhibited the adhesion strength of 2.5 kN/m or greater and the rubber sticking of 60% or greater even after being stored for 4 weeks.

As is clear from Tables 7 and 8, all the vulcanized hose-shaped test pieces produced by using the compositions of Comparative Examples 1 to 14 exhibited the adhesion strength of less than 2.5 kN/m and the rubber sticking of less than 60% after being stored for 4 weeks. Furthermore, for Comparative Examples 4, 5, 7, 11, 12, and 14, both the rubber mixability/processability and the rubber appearance were poor.

What is claimed is:

1. A rubber composition adhesive to a metal surface, the rubber composition being capable of adhering to a metal surface, the rubber composition comprising:
   a diene polymer selected from the group consisting of styrene-butadiene rubber (SBR), nitrile-butadiene rubber (NBR), and ethylene-propylene-diene rubber (EPDM),
   from 1.0 part by mass to 15 parts by mass of water, per 100 parts by mass of the diene polymer that can be sulfur-vulcanized, and
   from 3.0 parts by mass to 6.0 parts by mass of a poly(acrylic acid) partial sodium salt crosslinked product as a water absorbing resin, per 100 parts by mass of diene polymer that can be sulfur-vulcanized.

2. The rubber composition adhesive to a metal surface according to claim 1, the rubber composition further comprising a vulcanizing agent.

3. A laminated body of a rubber composition and a metal, in which a rubber layer containing the rubber composition adhesive to a metal surface and a reinforcing layer having a metal surface are laminated,
   wherein the rubber composition comprises:
   a diene polymer selected from the group consisting of styrene-butadiene rubber (SBR), nitrile-butadiene rubber (NBR), and ethylene-propylene-diene rubber (EPDM);
   a poly(acrylic acid) partial sodium salt crosslinked product as an water absorbing resin; and
   water,
   wherein an amount of the water absorbing resin is 3.0 parts by mass to 6.0 parts by mass, and an amount of the water is 1.0 part by mass to 15 parts by mass, per 100 parts by mass of the diene polymer that can be sulfur-vulcanized.

4. The laminated body of a rubber composition and a metal according to claim 3, wherein the metal surface is a brass-plated metal surface.

5. The laminated body of a rubber composition and a metal according to claim 4, wherein the reinforcing layer has a braided structure in which wires have been braided, or a spiral structure.

6. A vulcanized rubber product, in which the rubber layer of the laminated body of a rubber composition and a metal described in claim 3 is vulcanized in the presence of a sulfur-containing vulcanizing agent and adhered to the reinforcing layer.

7. The vulcanized rubber product according to claim 6, wherein the vulcanized rubber product is a hydraulic hose or a high pressure hose.

8. The vulcanized rubber product according to claim 7, wherein the hydraulic hose or the high pressure hose is vulcanized by passing through an oven vulcanization device.

9. A method of producing a vulcanized rubber product, the method comprising:
   a laminating step for producing a laminated body by laminating a reinforcing layer in which a surface is plated with brass and at least one rubber layer; and
   a vulcanization adhering step of vulcanizing the rubber layer by passing the laminated body through an oven vulcanization device and adhering the brass-plated reinforcing layer;
   the rubber layer being a rubber composition containing:
      a diene polymer selected from the group consisting of styrene-butadiene rubber (SBR), nitrile-butadiene rubber (NBR), and ethylene-propylene-diene rubber (EPDM);
      from 1.0 part by mass to 15 parts by mass of water, per 100 parts by mass of the diene polymer that can be sulfur-vulcanized, and
      from 3.0 parts by mass to 6.0 parts by mass of a poly(acrylic acid) partial sodium salt crosslinked product as a water absorbing resin, per 100 parts by mass of diene polymer that can be sulfur-vulcanized; and
   the vulcanized rubber product further comprising a sulfur-containing vulcanizing agent.

10. The laminated body according to claim 3, wherein an adhesive strength of the rubber composition adhesive is with the range of 3.0 kN/m to 4.5 kN/m based on an adhesion test selected from steam vulcanization adhesion between newly kneaded rubber and brass-plated wires or oven vulcanization adhesion between newly kneaded rubber and brass-plated wires.

\* \* \* \* \*